United States Patent
Chang et al.

(10) Patent No.: US 8,378,923 B2
(45) Date of Patent: Feb. 19, 2013

(54) LOCATING AND DISPLAYING METHOD UPON A SPECIFIC VIDEO REGION OF A COMPUTER SCREEN

(75) Inventors: Kuo-Lung Chang, Junghe (TW); Hsing-Yung Wang, Junghe (TW)

(73) Assignee: Awind Inc., Taipei County (TW)

( * ) Notice: Subject to any disclaimer, the term of this patent is extended or adjusted under 35 U.S.C. 154(b) by 0 days.

(21) Appl. No.: 13/453,479

(22) Filed: Apr. 23, 2012

(65) Prior Publication Data

US 2012/0206318 A1 Aug. 16, 2012

Related U.S. Application Data

(62) Division of application No. 12/043,583, filed on Mar. 6, 2008.

(30) Foreign Application Priority Data

Sep. 20, 2007 (TW) .............................. 96135034 A

(51) Int. Cl.
*G09G 5/00* (2006.01)
(52) U.S. Cl. ............. 345/1.2; 345/3.1; 345/1.1; 345/3.3
(58) Field of Classification Search ................... 345/1.1, 345/1.2, 2.1–2.3, 3.1–3.4
See application file for complete search history.

(56) References Cited

U.S. PATENT DOCUMENTS

| | | | | |
|---|---|---|---|---|
| 6,025,871 A | * | 2/2000 | Kantor et al. | 348/14.07 |
| 7,876,287 B2 | * | 1/2011 | McLarty et al. | 345/2.2 |

* cited by examiner

*Primary Examiner* — Srilakshmi K Kumar
(74) *Attorney, Agent, or Firm* — Ming Chow; Sinorics, LLC

(57) ABSTRACT

A locating and displaying method upon a specific video region of a computer screen comprises the steps of: capturing a plurality of computer screens during a predetermined time period; comparing one computer screen with the following computer screen to locate a plurality of screen differences, in which every single screen difference includes at least one different region; judging a respective position of every individual different region of each screen difference so as to locate an object window containing the different region; determine one object window as a video region by comparing a size or an appearance time of the object window; capturing a film of the video region; forwarding the film to a distant displayer; and then the displayer broadcasting the film on a display.

7 Claims, 6 Drawing Sheets

LOCATING AND DISPLAYING METHOD UPON A SPECIFIC VIDEO REGION OF A COMPUTER SCREEN

The current application is a divisional application of, and claims a priority to Ser. No. 12/043,583 filed on Mar. 6, 2008.

The current application also claims a foreign priority to the application of Taiwan No. 096135034, filed Sep. 20, 2007.

BACKGROUND OF THE INVENTION (1) Field of the Invention

The invention relates to a method for displaying a computer video on another display screen, and more particularly to a display method that can locate a specific video region of a computer screen, forward the same and display the same on another screen.

(2) Description of the Prior Art

Nowadays, network sources have become one of major providers of knowledge and entertainment. Tremendous amount of image data can be immediately available through network download. Further, share information can be also quickly posted to a website through the networking.

For most of applications in multimedia display over the network, the computer is the inevitable tool to share the network information. To those unfamiliar with the computer operation or to those uncomfortable to entertain the network video files through a computer screen (or monitor), the network resources would be much attractive if the network media can be directly displayed on another screen, other than the tiny computer screen, such as a TV screen in the living room.

Please refer to FIG. 1, a typical framework is shown to demonstrate how a computer video can be displayed in another screen. The framework includes a computer 10, a displayer 12 and a display (or screen) 14.

The computer 10 capable of networking and multimedia playing can display streaming media through some video-sharing websites such as YouTube, or can display video files pre-stored in a hard disk or a disc player of the computer 10. No matter what kind of aforesaid displaying is performed, the computer 10 need to install a specific display program. In particular, some formats of video files can only be played through specific display programs. Hence, to have the computer 10 able to display versatile multimedia files, various display programs need to be installed inside the computer 10.

The displayer 12 can be cabled or connected wirelessly to the computer 10 so as to establish a local internet 16. Through the internet 16, the displayer 12 can receive multimedia streams from the computer 10, and further forward the received multimedia streams to the display 14 (an LCD TV for example) for broadcasting. In the case that the computer 10 can compress and encode the streams, then the displayer 12 should have respective functions in uncompressing and decoding so that the multimedia streams received from the computer 10 can be displayed in the display 14. Further, the displayer 12 can include a remote control 121 and an accompanying wireless receiver 122. The wireless receiver 122 built in the displayer 12 is used to receive commands from the remote control 121. These commands include that to have the displayer 12 to capture specific multimedia streams in the computer 10, that to output the multimedia streams to the display 14 for broadcasting, and so on.

Generally, a video-sharing website uses to provide a tiny video region 102 to occupy portion of the computer screen 101, and leaves the rest 104 of the computer screen 101 for commercial purposes. Yet, to the user, it is favorite to have the video region 102 to be enlarged to occupy the whole area of the computer screen 101 and to have the commercial area 104 to be zoomed as small as possible. In particular, it is hoped that the display 14 can only show the enlarged video from the video region 102, and expel all the commercial materials in the commercial area 104. However, by the current application, such a wish is almost infeasible and thus the introducing of the internet 16 and the computer 10 to the living room is less popular.

Also, in the art, for a remote control 121 able to control a distant computer 10, it should be equipped with sufficient hardware and software to achieve functions in replacing the keyboard and the mouse. Thus, the design in such a remote control 121 would be inevitably complicated. Furthermore, in the case that the computer screen 101 and the video region 102 present different features in controls, the operation of the remote control 121 would become ragged, especially when it is operated far away from the computer 10. It is clear that the conventional remote control 121 is less suitable for a user who is close to the display 14 but away from the computer 10.

SUMMARY OF THE INVENTION

Accordingly, it is an object of the present invention to provide a locating and displaying method upon a specific video region of a computer screen, by which a tiny video region on the computer screen can be forwarded and enlarged to a distant display for broadcasting.

In a first embodiment of the present invention, the locating and displaying method upon a specific video region of a computer screen comprises the steps of: capturing a plurality of computer screens (Si, where is an integral) in a time sequence during a predetermined time period (T); comparing the computer screen Si and the following computer screen Si+1 so as to locate a plurality of screen differences (Di) in between, in which every single screen difference Di includes at least a different region Ri; locating a target screen difference Dm from the group of Di's, in which the different region Ri of Dm covers each respective Ri of each Di; locating a largest (in area) different region Rv among plural Ri's of the Dm and defining the Rv as a video region; capturing a film of the video region; forwarding the film to a distant displayer; and the displayer broadcasting the film on the display.

In a second embodiment of the present invention, the locating and displaying method upon a specific video region of a computer screen comprises the steps of: capturing a plurality of computer screens (Si, where is an integral) in a time sequence during a predetermined time period (T); comparing the computer screen Si and the following computer screen Si+1 so as to locate a plurality of screen differences (Di) in between, in which every single screen difference Di includes at least a different region Ri; judging a position of every different region Ri of each screen difference Di so as to locate an object window Wi with respect to each single Ri; determining one of the Wi's as a video region Rv by comparing sizes and appearance times of the Wi's; capturing a film of the video region; forwarding the film to a distant displayer; and the displayer broadcasting the film on the display.

In the present invention, for the locating and displaying method does only capture the video region of the computer screen and display the video streams of the video region on a distant display through the displayer, only the video streams of the video region can be shown on the distant display, and all other images on the computer screen other than the target video region (such as the commercial materials) wouldn't be shown on the display, such that the interested video streams can be present on the display by a full-screen scale.

All these objects are achieved by the locating and displaying method upon a specific video region of a computer screen described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a locating and displaying method upon a specific video region of a computer screen. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
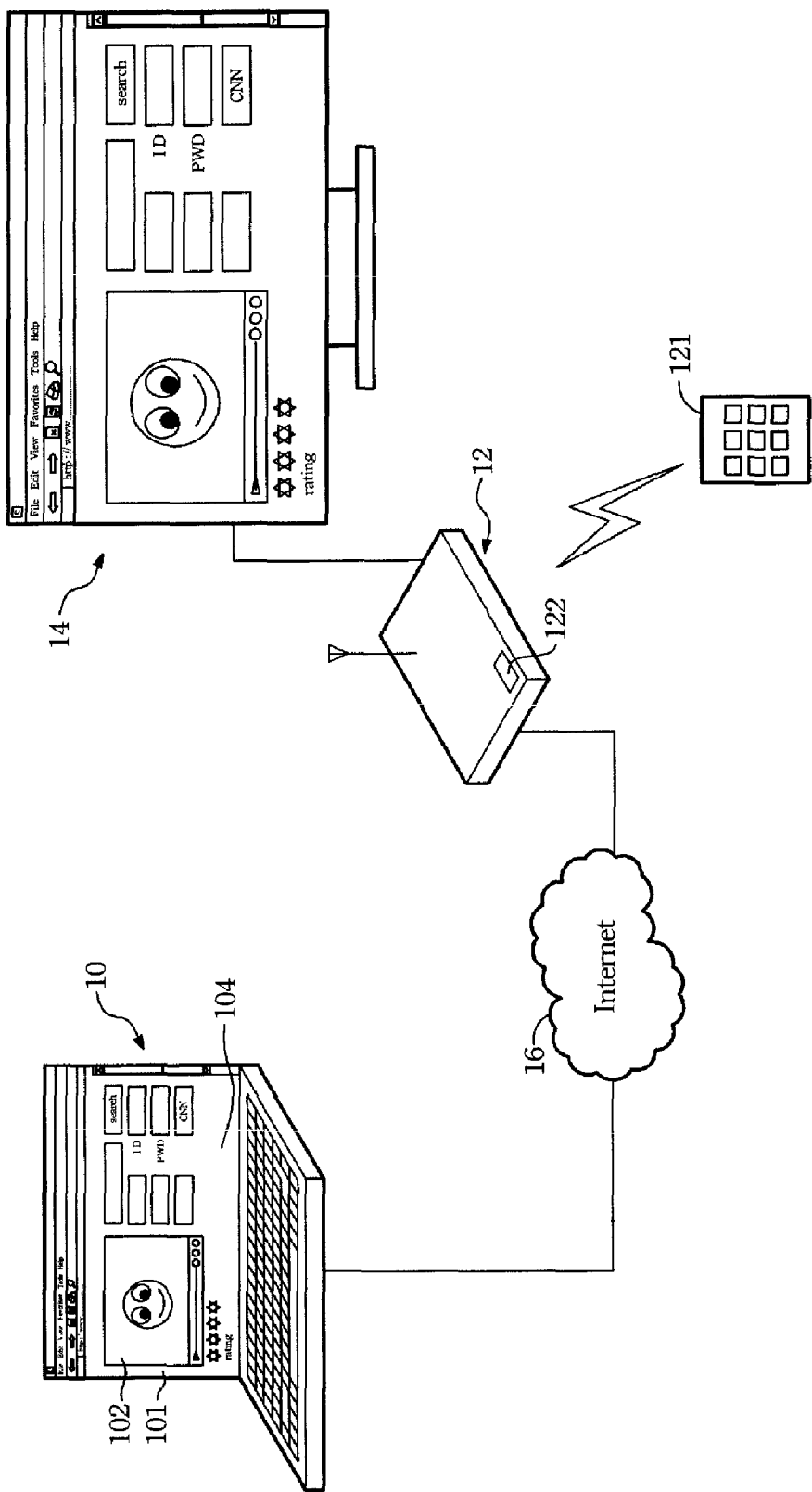
FIG. 1 is a schematic view of a typical framework shown to demonstrate how a computer image can be displayed in another screen.
Figure 2:
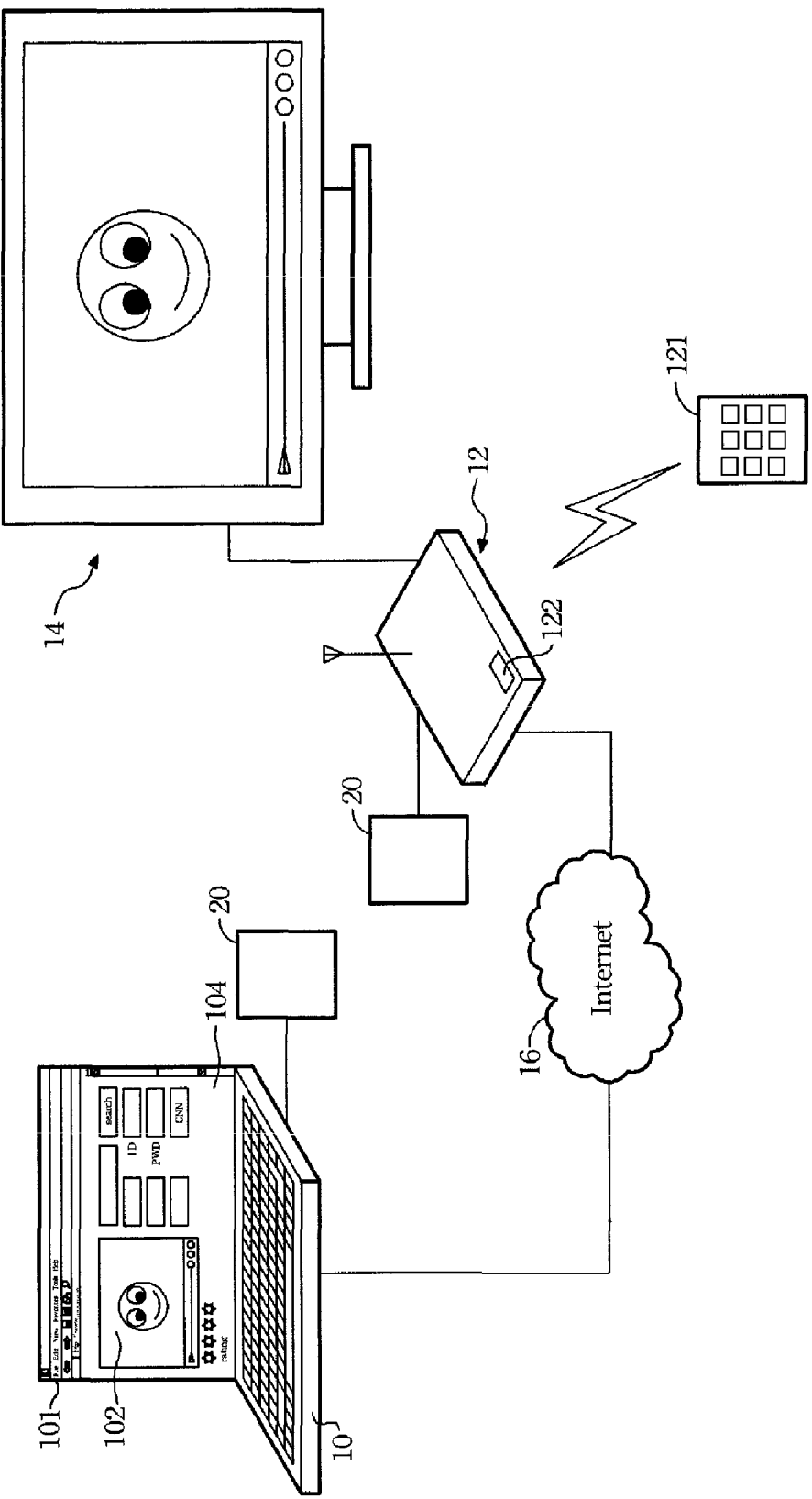
FIG. 2 is a schematic view of a framework that performs a locating and displaying method upon a specific video region of a computer screen in accordance with the present invention.

Referring now to FIG. 2, a schematic view of a framework that performs a locating and displaying method upon a specific video region of a computer screen in accordance with the present invention is shown. One of major features of the present invention is that a video region detection module 20 is built inside the computer 10. The video region detection module 20 can tell the video region 102 from the commercial area 104 in the computer screen 101, can capture video streams of the video region 102, can performing encoding and compressing upon the video streams, and can forward the video streams to the distant displayer 12 for further playing the video streams on the display 14 (for example, a TV set in the living room). In the display of the display 14, only the video streams in the video region 102 of the computer screen 101 can be shown.

In the present invention, the connection between the displayer 12 and the computer 10 can be a cable form or a wireless form through an internet 16. The video region detection module 20 can be stored inside the displayer in advance, and can be uploaded to the computer 10 as soon as the connection between the displayer 20 and the computer 10 is established. In general, the displayer 12 located usually adjacent to the display 14 can further include a remote control 121 and a wireless receiver 122. The remote control 121 is to issue commands to the wireless receiver 122. The displayer 12 can activate the video region detection module 20 inside the computer 10 to perform necessary detecting and broadcasting jobs.

Figure 3:
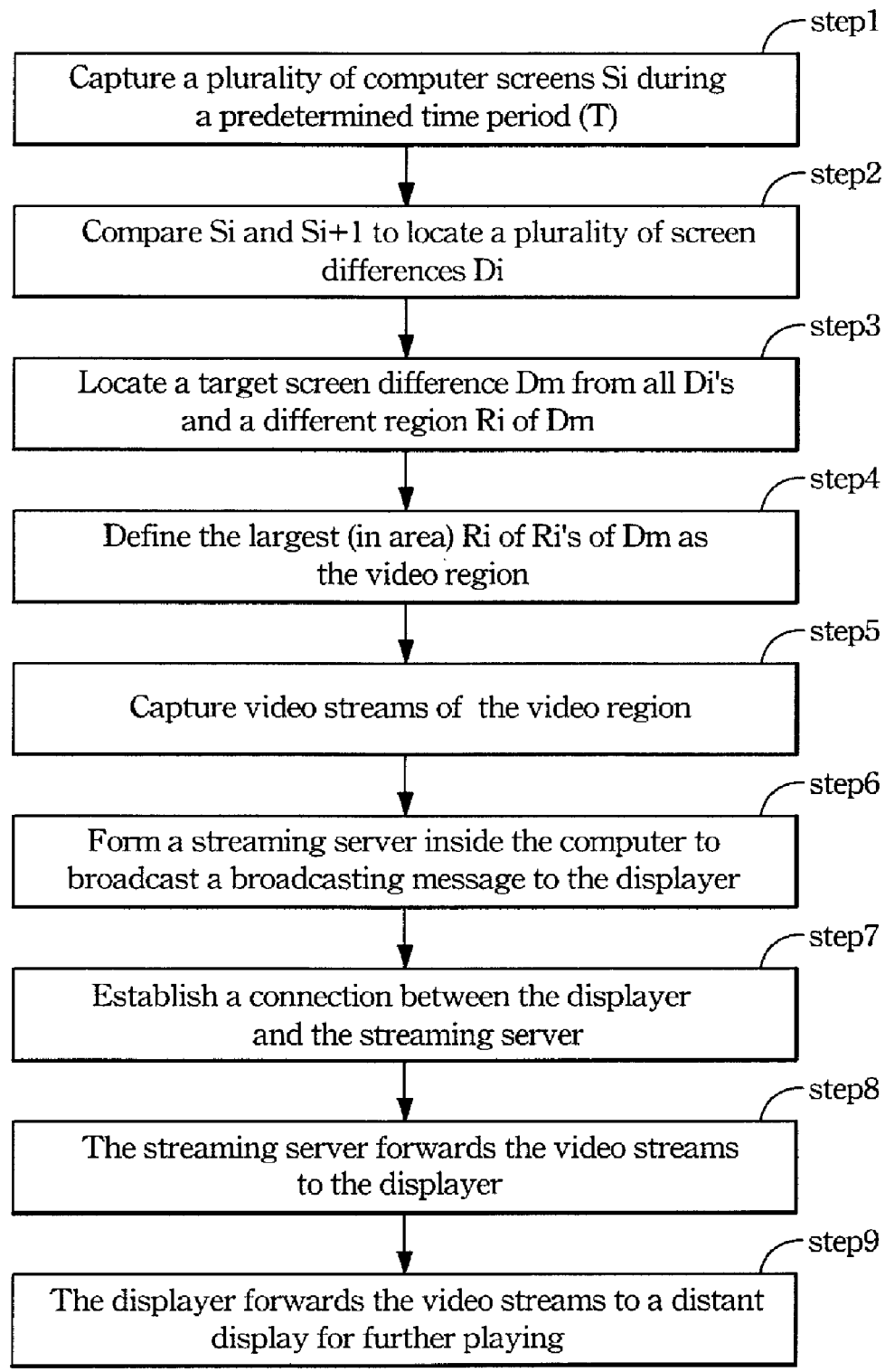
FIG. 3 is a flowchart of a first embodiment of the locating and displaying method upon a specific video region of a computer screen in accordance with the present invention.

Referring now to FIG. 3, a flowchart of a first embodiment of the locating and displaying method upon a specific video region of a computer screen in accordance with the present invention is shown. The locating and displaying method of the present invention comprises the following steps.

Step 1. Capture (or sample) a plurality of computer screens (Si, where i is an integral) in a time sequence during a predetermined time period (T). For example, sample 10 (i.e., i=1~10) computer screens in a second.

Figure 4:
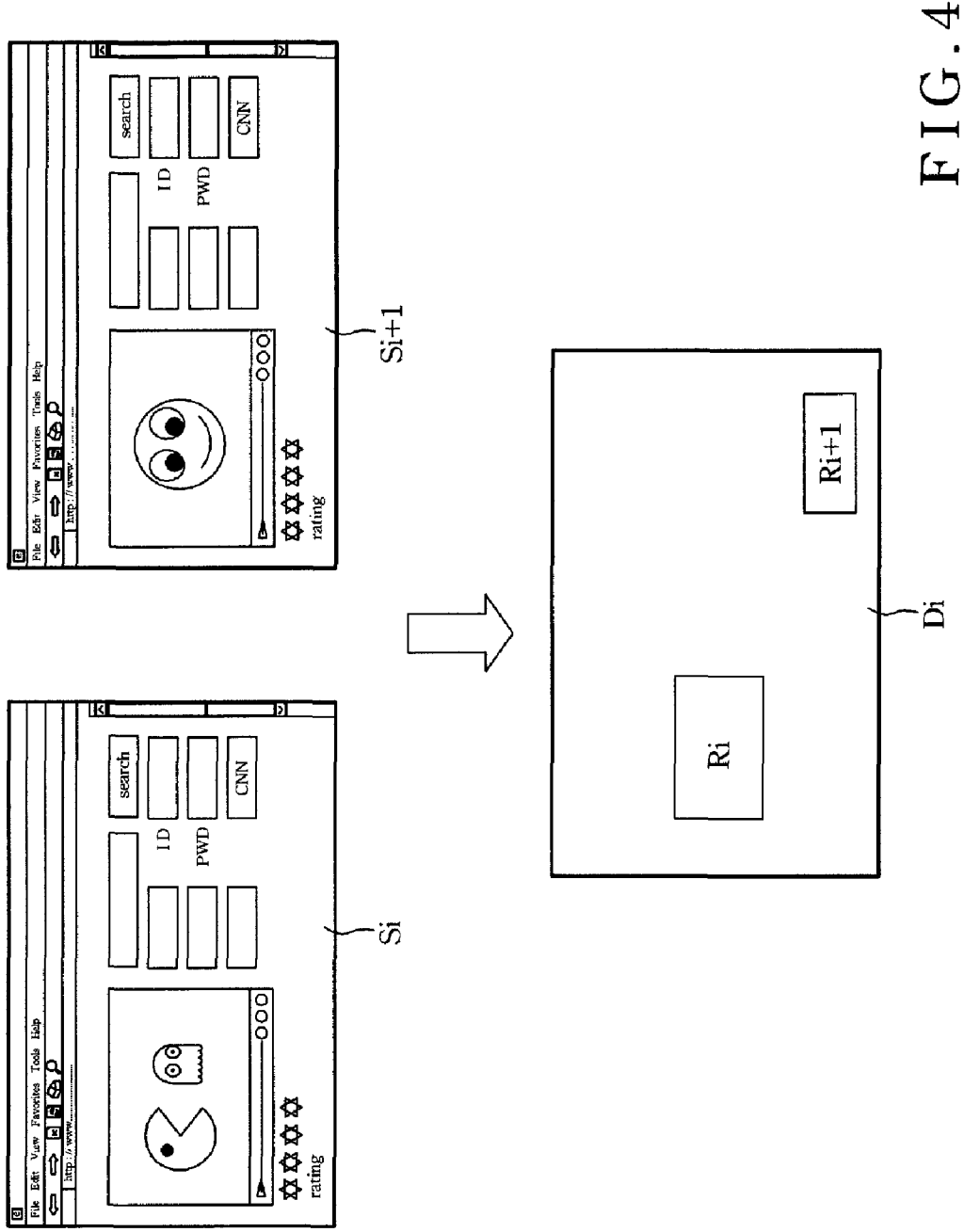
FIG. 4 is a schematic view to demonstrate how the Step 2 of FIG. 3 can be performed.

Step 2. Compare the current computer screen Si and the following computer screen Si+1 so as to locate a plurality of screen differences (Di) in between. Referring to FIG. 4, each of the screen differences Di's includes at least a different region Ri. That is to say, to the preceding example, a total number of 9 screen differences Di's (i=1~9) can be generated. In the present invention, the different region is defined to be the smallest square area on each difference district of the respective screen difference. Therefore, the number of the screen differences may be zero (namely, no difference between two computer screens) or more than one (namely, plural difference in between).

Figure 5:
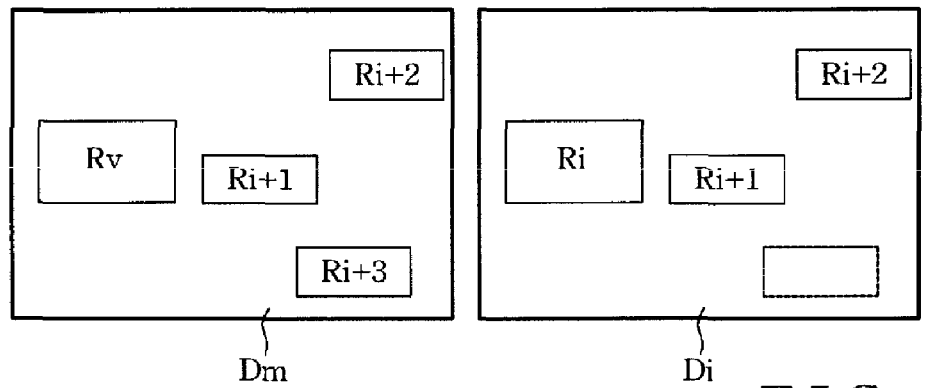
FIG. 5 is a schematic view to demonstrate how the Step 3 of FIG. 3 can be performed.

Step 3. Locate a target screen difference Dm from the group of Di's (say, from D1~D9), in which the different region Ri of Dm covers each respective Ri of each Di. Referring to FIG. 5, the purpose of this current step is to locate the screen difference (i.e., the target screen difference Dm) that can cover all the different regions Ri's.

Step 4. Define the largest (in area) different region among the plural Ri's of the Dm as the video region Rv. Generally, in a computer screen, for the area for the video region is larger than that for the commercial area, it can be taken for granted that the largest different region among all Ri's is the video region Rv. In FIG. 5, the contents in the video region Rv present the video streams the user want to see.

Step 5. Capture video streams (or say, a film) of the video region, for example, upon a section of films. In capturing the streams, a plurality of screens in the video region can be captured during a predetermined time period. For example, a rate of 24 captures per second can be adopted in capturing the video streams. Those captured video streams can be encoded and further compressed into streams with a specific format. For example, the mp4 format can be one of the acceptable formats.

Step 6. Form a streaming server inside the computer to broadcast a broadcasting message to the displayer, in which the broadcasting message includes the URL of the computer.

Step 7. Establish a connection between the displayer and the streaming server of the computer according to the URL of the broadcasting message.

Step 8. The streaming server forwards the compressed streams to the displayer, and then the displayer decodes and uncompresses the compressed streams into the respective uncompressed video streams.

Step 9. Forward the uncompressed video streams to a distant display for further playing.

Figure 6:
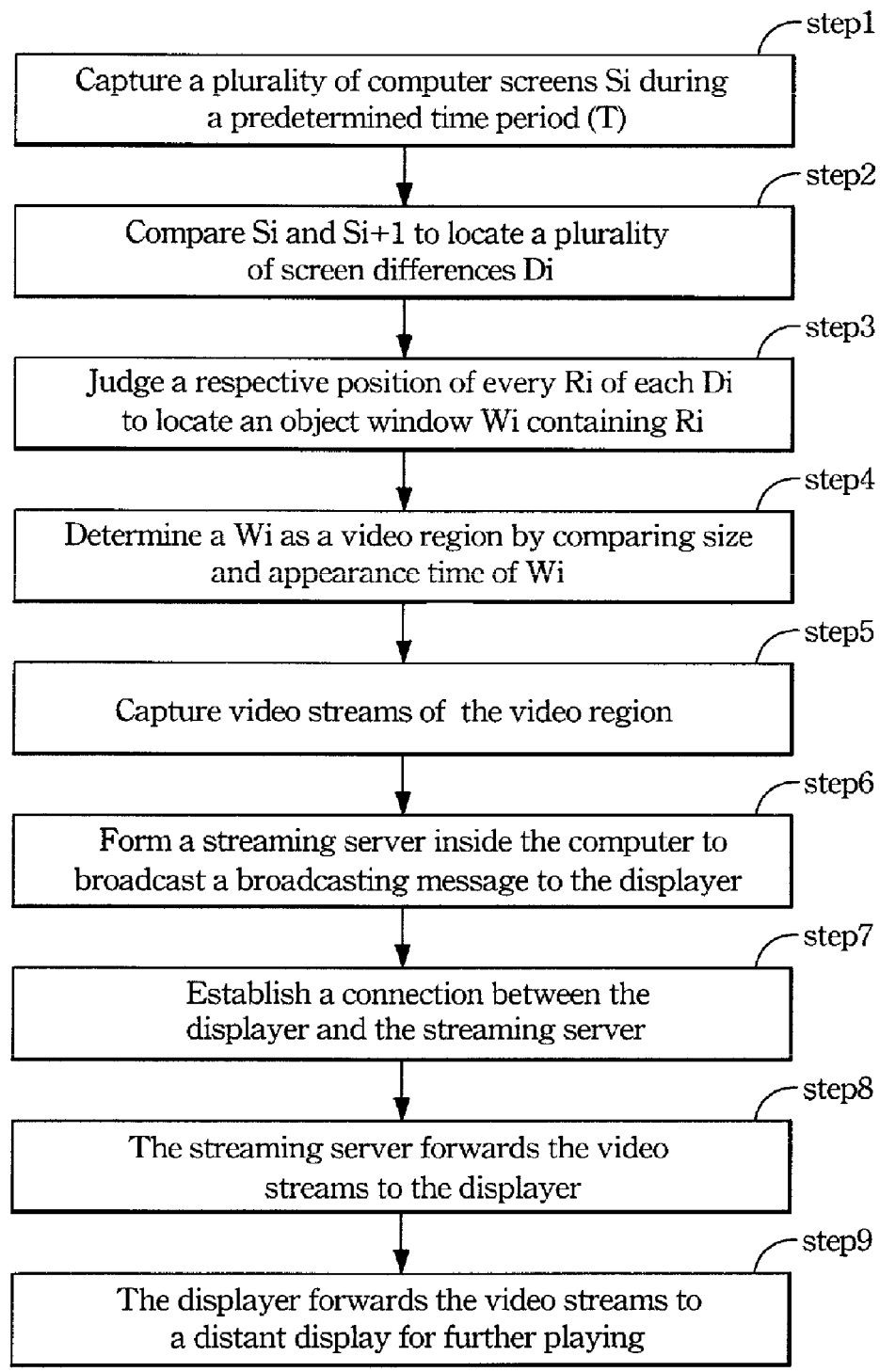
FIG. 6 is a flowchart of a second embodiment of the locating and displaying method upon a specific video region of a computer screen in accordance with the present invention.

Referring now to FIG. 6, a flowchart of a second embodiment of the locating and displaying method upon a specific video region of a computer screen in accordance with the present invention is shown. The locating and displaying method of the present invention comprises the following steps.

Step 1. Capture (or sample) a plurality of computer screens (Si, where i is an integral) in a time sequence during a predetermined time period (T). For example, sample 10 (i.e., i=1~10) computer screens in a second.

Step 2. Compare the current computer screen Si and the following computer screen Si+1 so as to locate a plurality of screen differences (Di) in between. Referring to FIG. 4, each of the screen differences Di's includes at least a different region Ri. That is to say, to the preceding example, a total number of 9 screen differences Di's (i=1~9) can be generated. In the present invention, the different region is defined to be the smallest square area on each difference district of the respective screen difference. Therefore, the number of the screen differences may be zero (namely, no difference between two computer screens) or more than one (namely, plural difference in between).

Figure 7:
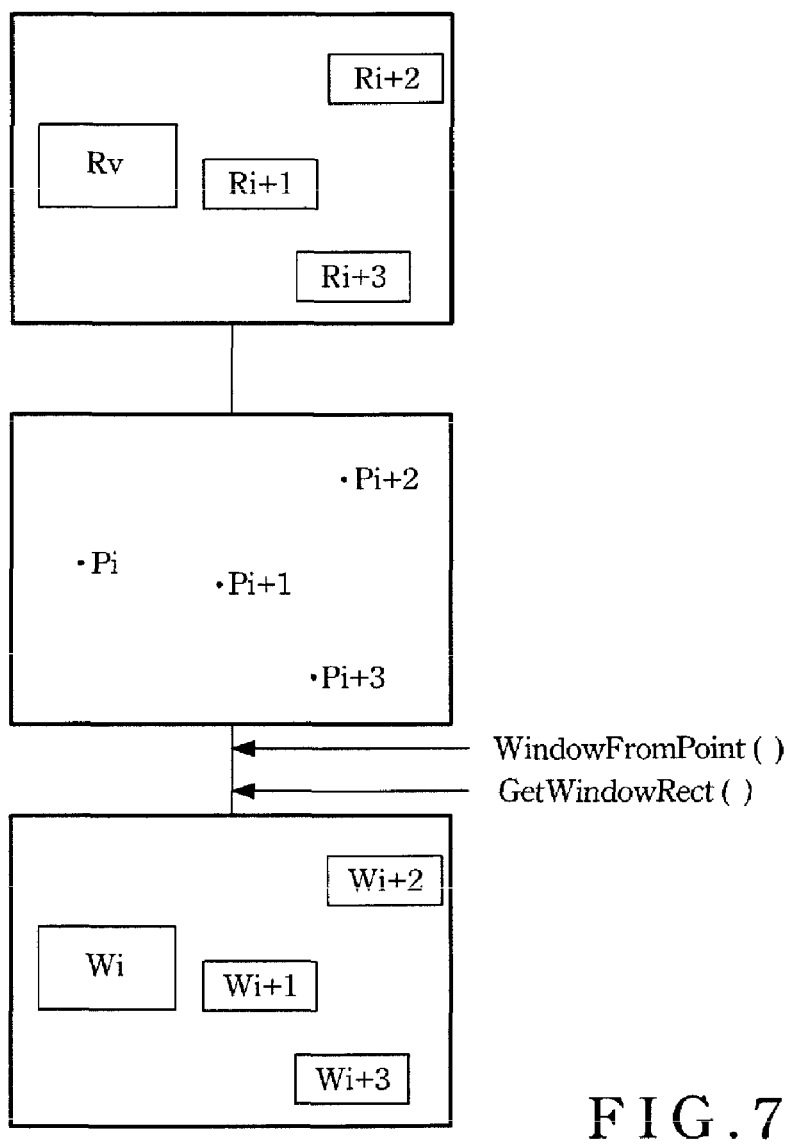
FIG. 7 is a schematic view to demonstrate how the different regions Ri's of plural screen differences Di's can be computed orderly by applying an application programming interface (API) provided by the operation system (OS) so as to locate an object window Wi.

Step 3. Judge a respective position of every different region Ri of each the screen difference Di so as to locate an object window Wi with respect to each single Ri. In positioning the Wi, referring to FIG. 7, the center point Pi of the respective Ri is firstly computed, then an appropriate API (for example, the WindowFromPoint( )) provided by the OS (for example, the MS Windows® system) of the computer is used to obtain an object window handle including the Pi, and finally another API (for example, the GetWindowRect( )) of the computer is used to locate the Wi including the Pi.

Step 4. Determine one of the Wi's as a video region Rv by comparing sizes or appearance times of the individual Wi's. For each of the Wi's can be the video region Rv or a non-video region (for example, a commercial area or the like), and for the video region usually has a broader area and a larger number in the appearance time of the different region, so it is practical to determine the video region Rv by judging the size and the appearance time of each of the object windows Wi's. In the present invention, a specific object window Wi is determined to be the video region Rv by having the largest number in the result of the area timing the appearance time.

Step 5. Capture video streams (or say, a film) of the video region, for example, upon a section of films. In capturing the streams, a plurality of screens in the video region can be captured during a predetermined time period. For example, a rate of 24 captures per second can be adopted in capturing the video streams. Those captured video streams can be encoded and further compressed into streams with a specific format. For example, the mp4 format can be one of the acceptable formats.

Step 6. Form a streaming server inside the computer to broadcast a broadcasting message to the displayer, in which the broadcasting message includes the URL of the computer.

Step 7. Establish a connection between the displayer and the streaming server of the computer according to the URL of the broadcasting message.

Step 8. The streaming server forwards the compressed streams to the displayer, and then the displayer decodes and uncompresses the compressed streams into the respective uncompressed video streams.

Step 9. Forward the uncompressed video streams to a distant display for further playing.

From the aforesaid description, the present invention is superior to the relevant prior art for the following reasons.

a. The present invention can directly locate the video region of the computer screen, capture the video region, and encode the video streams of the video region by a relevant format. Namely, no matter what the format of the video streams or the application program to play these video streams in the video region is, the present invention can still perform the aforesaid locating, capturing, editing and replaying the video streams in the video region.

b. By providing the present invention, any processing level of the CPU of the computer can still appropriately encode a predetermined length of the film in the video region of the computer screen, and thus no screen flickering or stalling can happen any more.

c. For only the video region of the computer screen can be shown in the display by providing the present invention, the video region can be replayed in the display in any acceptable zoom, such that a preferred screen size to amuse the video streams of the video region can be obtained.

d. In the present invention, the remote control can control the displayer in a more direct and simple way, just like a normal TV remote, to duplicate the playing of the video streams in the video region to the display.

While the present invention has been particularly shown and described with reference to a preferred embodiment, it will be understood by those skilled in the art that various changes in form and detail may be without departing from the spirit and scope of the present invention.

We claim:

1. A locating and displaying method upon a specific video region of a computer screen, comprising the steps of:
   a. capturing a plurality of computer screens Si's during a predetermined time period (T);
   b. comparing one of said computer screens Si and a following one of said computer screens Si+1 so as to locate a plurality of screen differences Di's, in which every single one of said screen differences Di's includes at least one different region Ri;
   c. judging a respective position of every individual said Ri of each said screen difference Di so as to locate a plurality of object window Wi's, wherein each object window Wi contains said respective Ri;
   d. determining one of said Wi's as a video region Rv by comparing a size and an appearance time of each of said Wi's;
   e. capturing a film of said video region;
   f. forwarding the film to a distant displayer; and
   g. the displayer broadcasting the film on a display.

2. The locating and displaying method upon a specific video region of a computer screen according to claim 1, wherein said step e is performed by firstly capturing a plurality of screens in said video region and then compressing the screens into said film.

3. The locating and displaying method upon a specific video region of a computer screen according to claim 1, wherein said step f is to form a streaming server inside said computer to broadcast a broadcasting message to said displayer, in which the broadcasting message is used to initiate a connection between said displayer and the streaming server for further forwarding said film to said displayer.

4. The locating and displaying method upon a specific video region of a computer screen according to claim 2, wherein said step g is performed by firstly said displayer decoding said film and then forwarding said film to a display for further playing.

5. The locating and displaying method upon a specific video region of a computer screen according to claim 1, wherein said step d to choose one said Wi as said Rv by, in which said Rv has the largest number in the result of the area timing the appearance time.

6. The locating and displaying method upon a specific video region of a computer screen according to claim 1, wherein said step c is performed by firstly computing a center point Pi of said respective Ri and then using an API provided by an OS of said computer to obtain said Wi including the Pi.

7. The locating and displaying method upon a specific video region of a computer screen according to claim 6, wherein said OS is an MS Windows® system and said API includes a WindowFromPoint( ) and a GetWindowRect( ).

* * * * *